May 6, 1952
F. G. MITCHELL
2,595,689
ENDLESS BUCKET CONVEYER
Filed May 20, 1949
2 SHEETS—SHEET 1
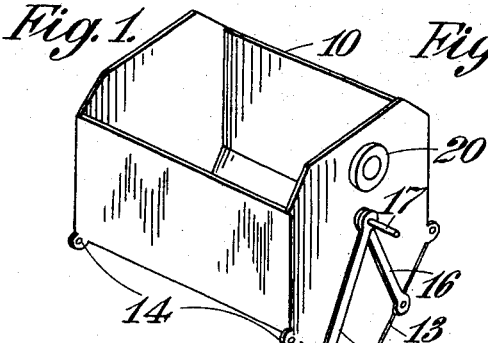
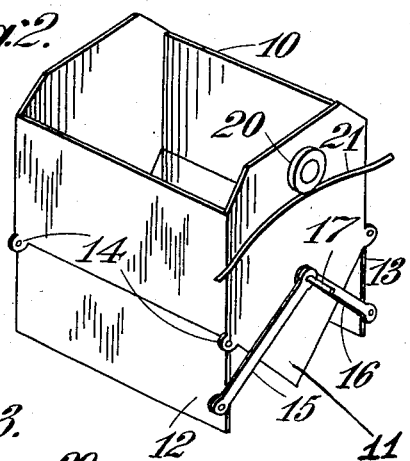
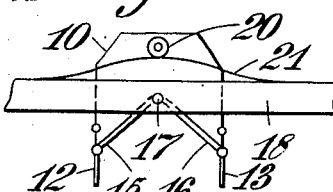
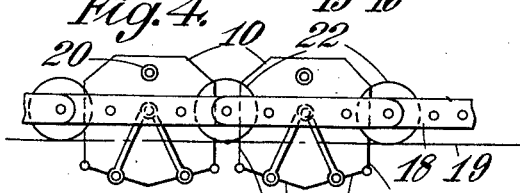
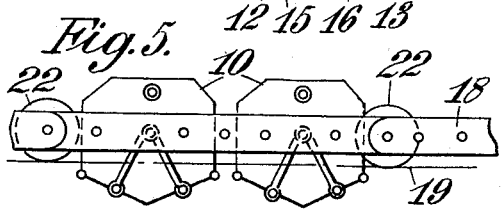
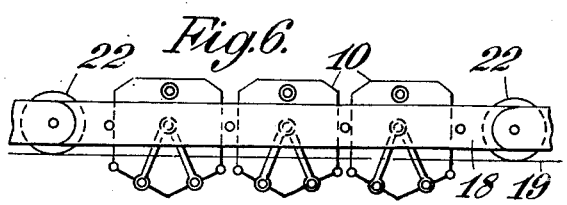
INVENTOR
Frederick G. Mitchell
By Watson, Cole, Grindle & Watson May 6, 1952 F. G. MITCHELL 2,595,689
ENDLESS BUCKET CONVEYER
Filed May 20, 1949 2 SHEETS—SHEET 2
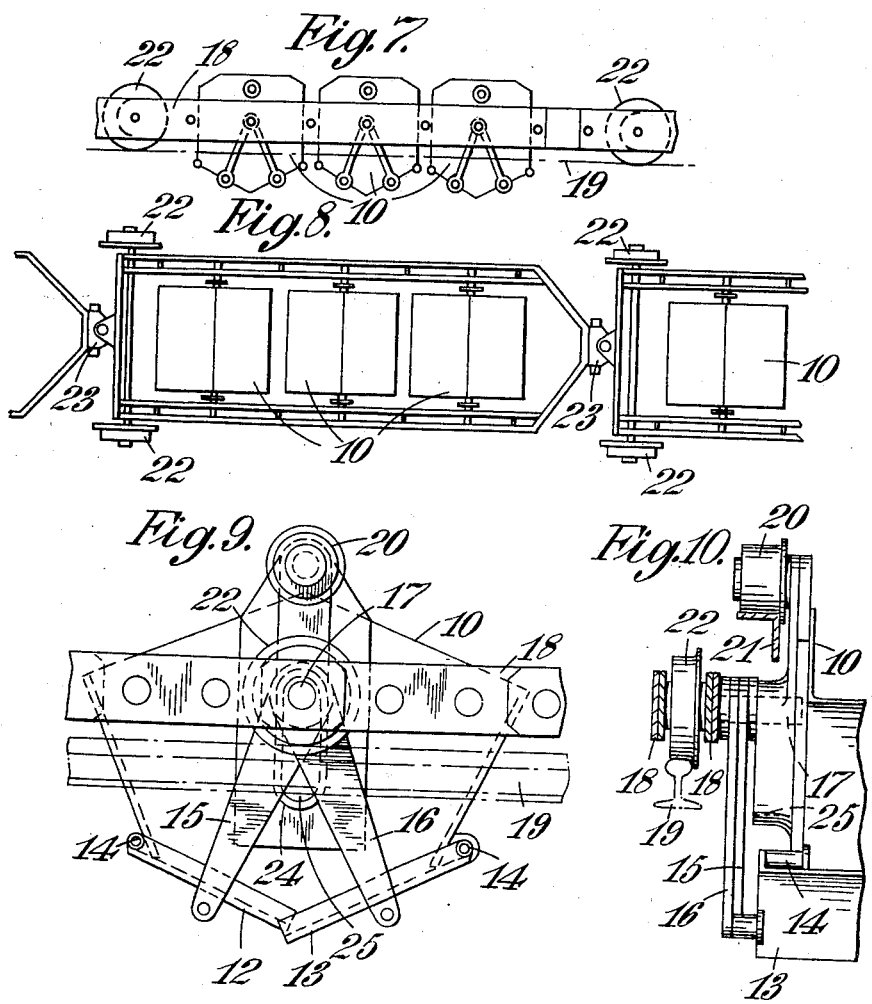
INVENTOR
Frederick G. Mitchell
By Watson, Cole, Grindle & Watson Patented May 6, 1952

2,595,689

UNITED STATES PATENT OFFICE 2,595,689

ENDLESS BUCKET CONVEYER

Frederick Gilbert Mitchell, London, England

Application May 20, 1949, Serial No. 94,350
In Great Britain March 4, 1948

8 Claims. (Cl. 198—143)

This invention relates to endless bucket conveyors and elevators of the type (hereinafter referred to as the type described) comprising in combination an endless chain, belt, cable or like carrier, a track defining the path of the endless carrier, and buckets or similar containers mounted on the carrier at spaced intervals in its length.

In conveyors of the type described the buckets are usually mounted pivotally on the endless carrier so as to be capable of tilting, and discharge of the load is effected by means of a fixed abutment, located in the path of the carrier at the desired discharge station and cooperating with cams or like devices on the buckets arranged to tip each bucket in turn through the requisite angle. These tipping devices in action cause a severe strain on the conveyor and on this account it may be necessary in practice to restrict the speed of the carrier, for example to 50–75 ft. per minute, and also to impose an undesirably low limit on the load-carrying capacity of the conveyor. One object of the present invention is to avoid or reduce these limitations.

This invention provides an endless bucket conveyor of the type described in which (a) each bucket has a bottom opening and a movable closure member associated with that opening; (b) each bucket is movable vertically, or otherwise against the action of gravity, in relation to the endless carrier; (c) each bucket is supported from the endless carrier by a coupling between the carrier and the bottom closure member so arranged that the weight of the bucket (and its contents) is taken by the coupling; and (d) means are associated with the conveyor track, at a selected location or locations in its length, for effecting relative lifting movement as aforesaid between each bucket and the carrier so as to take the weight off the coupling and permit opening of the bottom closure member and consequent discharge of the contents of the bucket.

In one arrangement according to the invention the movable closure member for the bottom opening in each bucket comprises two doors hinged to the body portion of the bucket, and the coupling aforesaid comprises jointed arms pivotally articulated to the doors and to the carrier. The endless carrier may consist of two link chains spaced apart and movable in parallel, with the buckets mounted between them. The links of the carrier chains may carry, at their pivotal linking points, running wheels arranged to run on the conveyor track, and the buckets may be supported by opposed links of the two chains, one or more buckets on each pair of opposed links and between each two adjacent running wheels.

In an embodiment of the invention in which the endless carrier consists of two link chains spaced apart and movable in parallel, with the buckets between them, two or more buckets are supported end-to-end on each pair of opposed chain links and each combination of buckets and links forms a unit which at one end carries a pair of running wheels to run on the conveyor track and at the other end is coupled by a universal joint to the wheeled end of the neighboring unit.

Some examples incorporating the foregoing and other features of the invention will now be described with reference to the accompanying drawings, which are to some extent diagrammatic, and in which:

Figure 1 is a perspective view of a bucket in the closed position,

Figure 2 is a similar view of the bucket opened,

Figure 3 is a diagram illustrating the action of the bucket-opening devices,

Figures 4 and 5 and 6 show in side elevation three different arrangements of buckets on the carrier, Figures 7 and 8 show in side elevation and plan respectively an alternative arrangement of buckets and carrier and Figures 9 and 10 show in side and end elevation respectively, a further bucket conveyor arrangement, particularly for use in elevators.

Like reference numerals indicate like parts in the various figures.

In every illustrated example each bucket 10 is of box shape, has top and bottom openings, and side walls which terminate in V-shaped extremities 11. The bottom opening of each bucket is adapted to be closed by two hinged doors 12, 13 hinged at 14 to the bottom portion of the bucket and, in their closed position, mating in V-shape with the correspondingly shaped side wall extremities 11 of the bucket (as shown in Figures 1 and 9). At each side of each bucket, the doors 12, 13 have pivotally connected to them (at points intermediate in their length) arms 15, 16 respectively, the arms of each pair extending upwardly in the form of an inverted V and at the apex of the V being pivotally jointed by a pin 17. The buckets are supported at spaced intervals along the length of an endless carrier comprising two chains 18 spaced apart and movable in parallel along a track 19 (see Figures 4–7 and 9–10). Each bucket 10 is supported from the carrier chains 18 by means of the pivot-pins 17. The side walls of each bucket carry antifriction rollers 20 and at the discharge station of the conveyor track 19 upwardly curved ramps 21 (Figures 3 and 10) are arranged to be engaged by the rollers 20 on the buckets. The weight of each bucket and its contents is normally taken by the arms 15, 16, but on arrival at the discharge station of the carrier track, the rollers 20 of each bucket in turn ride on to and over the ramps 21, which thereupon relieve the weight of each bucket and its contents from the arms 15, 16 (the pins 17 retaining their positions on the carrier chains) and under the action of gravity the doors 12, 13 open, with the consequent discharge of the contents of each bucket.

In the example shown in Figure 4, the links of the chains 18 carry at their pivotal linking points, running wheels 22 arranged to run on the track 19 defining the path of the conveyor, and the buckets 10 are supported by opposed links of the two chains, one bucket on each pair of opposed links and between each two adjacent running wheels. In the arrangements shown in Figures 5 and 6, two and three buckets respectively are supported end-to-end on each pair of opposed chain links and between each two adjacent running wheels. In the arrangement shown in Figures 7 and 8, three buckets 10 are supported end-to-end on each pair of chain links and each combination of buckets and links forms a unit which at one end carries a pair of running wheels 22 and at the other end is coupled by a universal joint 23 to the wheeled end of the neighbouring unit. These universal couplings between the units enable the conveyor to travel along straight or curved tracks extending in horizontal, inclined or vertical directions.

In the example shown in Figures 9 and 10 the following modifications, in relation to the foregoing examples, are made. The end walls of each bucket slope towards one another as shown in Figure 9. The buckets are supported at pivotal linking points of the chain links, i. e. the coupling pin 17 of the arms 15, 16 is a continuation of a chain link pivot. Wherever a running wheel 22 is provided its axle is in alignment with a chain link pivot, and the running wheels are positioned at bucket locations on the chains. A guide member 24 furnished with a vertical slot 25 is secured to (or is integral with) each side wall of the bucket and the pins 17 extend into the vertical slots of the guide members. When each bucket is lifted at the discharge station, the pins 17 ride in the slots and maintain the verticality of the bucket.

In each of the foregoing examples the centre of gravity of each bucket and its load is located below the point of suspension of the bucket from the carrier, so that the buckets will retain their vertical positions irrespective of the path of the conveyor, which may take any inclination up to the vertical.

The invention includes, for use with an endless bucket conveyor or elevator of the type described, a bucket having a bottom opening and associated therewith a movable closure comprising two doors hinged to the body portion of the bucket, elbow-jointed arms coupled pivotally, at their ends remote from the joint, to the doors, and slotted guides on the walls of the bucket for guiding the elbow-joints of the arms.

I claim:

1. An endless bucket conveyor comprising an endless carrier, a track defining a path for the carrier, a plurality of buckets associated with the carrier at spaced intervals in its length, each bucket having a body portion capable of lifting movement in relation to the carrier and having movable closure means associated with an opening at the bottom of the body portion, combined, for each bucket, with a coupling connected at one end to the carrier and at the other to the bottom closure means of the bucket in such manner that the weight of the bucket and its contents is taken by the coupling and the tension in the coupling applied to the bottom closure means to maintain said means in the closed position, and combined with means in the path of the carrier for effecting relative lifting movement as aforesaid between each bucket and the carrier so as to take the weight off the coupling and permit opening of the bottom closure means and consequent discharge of the contents of the bucket.

2. An endless bucket conveyor according to claim 1 in which the endless carrier consists of two link chains spaced apart and movable in parallel, with the buckets mounted between them.

3. An endless bucket conveyor according to claim 1 in which the endless carrier consists of two link chains spaced apart and movable in parallel, with the buckets mounted between them, combined with running wheels carried at pivotal linking points of the chains and arranged to run on the conveyor track.

4. An endless bucket conveyor according to claim 1 in which the endless carrier consists of two link chains spaced apart and movable in parallel, with the buckets mounted between them, in which the links of the carrier chains carry at their pivotal linking points running wheels arranged to run on the conveyor track and in which the buckets are supported by opposed links of the two chains, one or more buckets on each pair of opposed links and between each two adjacent running wheels.

5. An endless bucket conveyor according to claim 1 in which the endless carrier consists of two link chains spaced apart and movable in parallel, with the buckets mounted between them, and in which two or more buckets are supported side by side on each pair of opposed chain links and each combination of buckets and links forms a unit which at one end carries a pair of running wheels to run on the conveyor track and at the other end is coupled by a universal joint to the wheeled end of the neighbouring unit.

6. An endless bucket conveyor according to claim 1 in which the endless carrier is of the link chain type, and the movable closure means for the bottom opening in each bucket comprises two doors hinged to the body portion of the bucket, the coupling aforesaid comprising elbow-jointed arms pivotally articulated at their elbows to joints between links of the carrier chain and at their outer ends pivotally articulated to the doors.

7. An endless bucket conveyor according to claim 1 in which the movable closure means for the bottom opening in each bucket comprises two doors hinged to the body portion of the bucket, in which the coupling aforesaid comprises jointed arms, pivotally articulated to the doors and to the carrier, in which the carrier consists of two link chains spaced apart and movable in parallel, with the buckets mounted between them and in which there are vertically slotted guide members on the side walls of each bucket and received within the slots of said members pins which constitute in common, axles for running wheels to run on the conveyor tracks, pivotal articulations between the jointed arms, and joint pivots for the chain links.

8. An endless bucket conveyor according to claim 1, in which the bottom closure means for each bucket comprise two doors hinged to the body portion of the bucket and the coupling aforesaid comprises elbow-jointed links which at the elbow, are coupled to the endless carrier and at their open ends are pivotally articulated to the doors at positions spaced from their hinges.

FREDERICK GILBERT MITCHELL.

REFERENCES CITED

The following references are of record in the file of this patent:

UNITED STATES PATENTS

| Number | Name | Date |
|---|---|---|
| 413,061 | Howard | Oct. 15, 1889 |
| 630,799 | Decker | Aug. 8, 1899 |
| 1,739,392 | Foote | Dec. 10, 1929 |
| 1,922,970 | McKenny | Aug. 15, 1933 |